US009752552B2

(12) United States Patent
Yu et al.

(10) Patent No.: US 9,752,552 B2
(45) Date of Patent: Sep. 5, 2017

(54) POSITION-CONTROLLED WAVE POWER GENERATING APPARATUS

(71) Applicant: Postech Academy-Industry Foundation, Gyeongsangbuk-do (KR)

(72) Inventors: Son-Cheol Yu, Gyeongsangbuk-do (KR); Han Gil Joe, Gyeongsangnam-do (KR); Seok Min Wi, Jeollanam-do (KR); Hyeon Woo Cho, Gyeongsangbuk-do (KR); Jeong Hwe Gu, Daegu (KR); Min Sung Kim, Ulsan (KR); Hee seung Kwon, Gyeongsangbuk-do (KR); Jason Seungjoo Lee, Seoul (KR); Ju Hyun Pyo, Gyeongsangnam-do (KR)

(73) Assignee: Postech Academy-Industry Foundation, Gyeongsangbuk-do (KR)

( * ) Notice: Subject to any disclaimer, the term of this patent is extended or adjusted under 35 U.S.C. 154(b) by 245 days.

(21) Appl. No.: 14/790,854

(22) Filed: Jul. 2, 2015

(65) Prior Publication Data

US 2016/0003213 A1 Jan. 7, 2016

(30) Foreign Application Priority Data

Jul. 3, 2014 (KR) ........................ 10-2014-0083259

(51) Int. Cl.
*F03B 13/22* (2006.01)
*F03B 13/18* (2006.01)

(52) U.S. Cl.
CPC ....... *F03B 13/183* (2013.01); *F05B 2250/311* (2013.01); *F05B 2250/315* (2013.01); *F05B 2270/18* (2013.01); *Y02E 10/38* (2013.01)

(58) Field of Classification Search
CPC .... F03B 13/1825; F03B 13/183; F03B 13/20; F03B 13/22; F05B 2250/311; F05B 2250/315; F05B 2270/18
See application file for complete search history.

(56) References Cited

U.S. PATENT DOCUMENTS

| 2012/0119499 A1* | 5/2012 | Kato | ..................... F03B 17/063 |
| | | | 290/52 |
| 2012/0124986 A1* | 5/2012 | Carter | ..................... F03B 13/22 |
| | | | 60/398 |
| 2014/0077496 A1* | 3/2014 | Gill Londono | ....... F03B 13/142 |
| | | | 290/53 |

FOREIGN PATENT DOCUMENTS

| JP | 08-127387 | 5/1996 |
| KR | 1020080070412 A | 7/2008 |
| KR | 1020110065998 A | 6/2011 |
| WO | WO 2010/057419 A1 | 5/2010 |

* cited by examiner

*Primary Examiner* — Jonathan Matthias
(74) *Attorney, Agent, or Firm* — Reinhart Boerner Van Deuren P.C.

(57) ABSTRACT

A position-controlled wave power generating apparatus. A position-controlled wave power generating apparatus is included a floating part floatable on a body of water, a motion conversion unit coupled to a floating part, a power generating unit generating electricity using a generator connected to a motion conversion unit, and a position control unit positioned below a water surface to generate a thrust from the energy of waves.

15 Claims, 7 Drawing Sheets

POSITION-CONTROLLED WAVE POWER GENERATING APPARATUS

CROSS-REFERENCE TO RELATED PATENT APPLICATIONS

This patent application claims the benefit of Korean Patent Application No. 10-2014-0083259, filed on Jul. 3, 2014, the entire teachings and disclosure of which are incorporated herein by reference thereto.

BACKGROUND OF THE INVENTION

Field of the Invention

The present invention relates to a wave power generating apparatus.

Description of the Related Art

In general, floating structures such as a buoy can be operated on the sea, and provided with equipment for observing weather and maritime conditions, such as the direction of the wind, the velocity of the wind, temperature, humidity, the temperature of the water, atmospheric pressure, the height of waves, the period of waves, and the direction of waves. Such floating structures serve very important roles in research, such as Tropical Ocean and Global Atmosphere program (TOGA) and World Ocean Circulation Experiment (WOCE), and are usefully applicable to maritime transport, fisheries, marine leisure, and the like.

Such floating structures may be divided into a moored floating structure using an anchor fixed to the seabed and a drifting floating structure moving with ocean currents.

The moored floating structure is kept in place by being anchored to the seabed. The anchor is connected to a floating part, such as a buoy, floating on the sea surface using a connecting means, such as chains. Accordingly, observation can be made in the state in which the floating part is secured such that the floating part does not drift.

In the moored floating structure, the mooring or anchoring operation, i.e. the operation of fixing the anchor to the deep seabed, requires very difficult works. In addition, the use of expensive equipment is required, consuming excessive construction costs. When the connecting means are broken or cut by a natural disaster, such as a hurricane, it is difficult to recover the floating part on which expensive equipment is mounted.

The drifting floating structure has the advantage of inexpensive installation costs. However, unlike the moored floating structure, the drifting floating structure performs observation while drifting on ocean currents without being fixed to a specific place. Therefore, it is difficult to precisely observe a specific area.

The moored floating structure or the drifting floating structure is additionally provided with a power supply, such as a solar generator or a battery, in order to supply electricity to the observation equipment. When a cloudy state lasts for a long time, solar power generation is impossible. Thus, it is difficult to reliably supply power to the observation equipment. In addition, a discharged battery must be replaced with a new one.

Although various types of wave power generation apparatuses have been disclosed, there is still urgent need for the development of a power generation apparatus able to reliably supply power such that precise observation is possible within a restricted area in the open sea without worries of loss or drifting, which would otherwise be caused when a connecting means is cut.

SUMMARY OF THE INVENTION

Accordingly, the present invention has been made keeping in mind the above problems occurring in the related art, and the present invention is intended to propose a position-controlled wave power generating apparatus able to generate electricity while freely drifting on ocean currents without being fixed to the seabed and maintaining a drifting position in a specific maritime area.

Also provided is a position-controlled wave power generating apparatus able to escape from bad weather by submerging below the sea surface and precisely control the submergence position.

In order to achieve the above object, according to one aspect of the present invention, there is provided a position-controlled wave power generating apparatus including: a floating part floatable on a body of water, a motion conversion unit coupled to the floating part, wherein the motion conversion unit converts a vertical motion caused by energy of waves into to a rotational motion, a power generating unit generating electricity using a generator connected to the motion conversion unit and a position control unit positioned below a water surface to generate a thrust from the energy of waves, the position control unit being connected to the motion conversion unit by means of a mooring member having a predetermined length, wherein the generator comprises a housing and a drive shaft coupled to the housing, the drive shaft being positioned on an extension line extending in a top-bottom direction from a center of rotation of the housing, wherein the motion conversion unit comprises: a first rotary part coupled to the housing of the generator, the first rotary part being rotatable together with the housing in a first direction about the extension line of the center of rotation; and a second rotary part coupled to the drive shaft of the generator, the second rotary part being rotatable together with the housing in a second direction opposite to the first direction, wherein the first rotary part comprises a first frame coupled to the housing of the generator and a first rotary blade disposed on the first frame, the first rotary blade configured to pivot about a first pivot axis perpendicular to the extension of the center of rotation, wherein the second rotary part comprises a third frame coupled to the drive shaft of the generator and a second rotary blade disposed on the third frame, the second rotary blade configured to pivot about a second pivot axis perpendicular to the extension of the center of rotation.

The position control unit comprises a propulsion frame connected to the motion conversion unit by means of the mooring member, a propulsion blade configured to pivot about a third pivot axis perpendicular to a straight direction of the propulsion frame and a rudder disposed on the propulsion frame at a predetermined angle of inclination, the rudder configured to convert a direction in which the propulsion frame proceeds to a curved direction, wherein, in a position in which the floating part is on the water surface and the generator, the first rotary part and the second rotary part are submerged in water, when the generator, the first rotary part, and the second rotary part are moved in a top-bottom direction in the water by waves, the housing and the drive shaft are rotated in opposite directions by force that the waves apply to the first rotary blade and the second blade, whereby the generator generates electricity, and wherein a thrust from the propulsion blade controls a position of the floating part floating on the water surface to be maintained within a predetermined range.

The first frame is in a shape of a ring that is disposed about the extension of the center of rotation, and a plurality of the first blades are disposed on an outer circumference of the ring-shaped first frame and are spaced apart from each other.

The plurality of the first blades are positioned at rear of the first pivot axis when viewed in the direction in which the first rotary part rotates, and the plurality of the first blades are able to pivot to an angle greater than 0° and smaller than 90° in a top-bottom direction about the first pivot axis.

Each of the first blades is in a shape of a plate, the plate extending such that one end thereof is positioned outside the first frame in order to increase an amount of force of water applied thereto when the first blade rotates about the first pivot axis.

The third frame is in a shape of a ring that is disposed about the extension of the center of rotation, and a plurality of the second blades are disposed on an outer circumference of the ring-shaped third frame and are spaced apart from each other.

The plurality of the second blades are positioned at rear of the second pivot axis when viewed in the direction in which the second rotary part rotates, and the plurality of the second blades are able to pivot to an angle greater than 0° and smaller than 90° in a top-bottom direction about the second pivot axis.

Each of the second blades is in a shape of a plate, the plate extending such that one end thereof is positioned outside the third frame in order to increase an amount of force of water applied thereto when the first blade rotates about the second pivot axis.

A gearbox coupled between the drive shaft of the generator and the second rotary unit.

The first rotary unit is symmetric to the second rotary unit in a top-bottom direction about the generator.

The propulsion frame comprises upper and lower frames arranged in a pair and parallel to each other and connecting frames connecting the upper and lower frames such that a predetermined distance is maintained between the upper and lower frames.

A plurality of the propulsion blades is disposed on one of the upper and lower frames in a longitudinal direction of the frames, the plurality of the propulsion blades being spaced apart from each other.

The position control unit comprises a steering part that converts a direction in which the propulsion frame proceeds to a straight direction or a curved direction, wherein the steering part comprises: a chamber provided in the propulsion frame and a steering motor disposed in an inner space of the chamber, the steering motor rotating a rotary shaft of the rudder rotatably assembled to the propulsion frame.

A buoyancy control unit controlling buoyancy of the floating part, wherein the buoyancy control unit comprises: a first tank disposed on the floating part, a first pump connected to a first water input line through which water is introduced into an inner space of the first tank and a first buoyancy control part firstly controlling the floating part to be submerged to a predetermined depth below the water surface.

The position-controlled wave power generating apparatus may further buoyancy control unit: a second tank disposed on an outer surface of the first tank, a second pump connected to a second water input line through which water is introduced into or discharged from an adjustment space divided by a partition disposed within the second tank and a second buoyancy control part secondly controlling a submergence position of the floating part in a top-bottom direction, the floating part having been submerged below the water surface by the first buoyancy control part.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
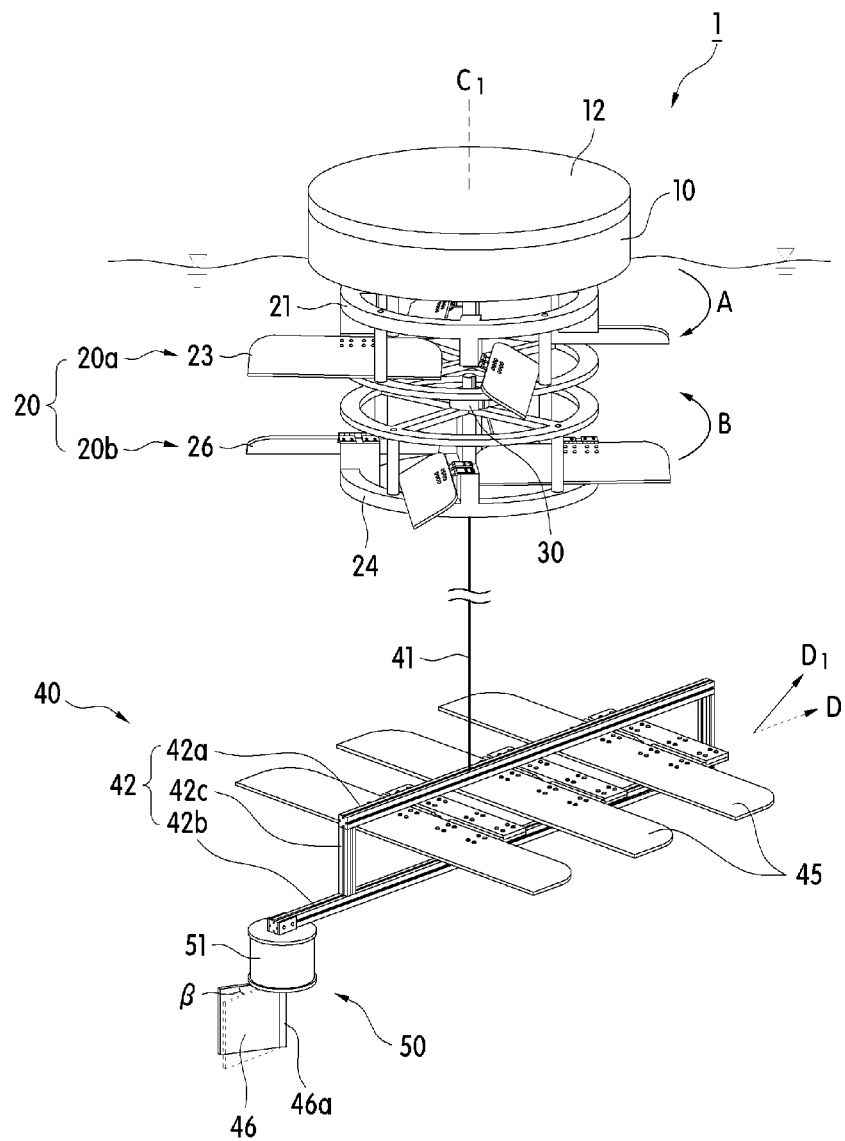
FIG. 1 is a perspective view illustrating a wave power generating apparatus according to an exemplary embodiment of the present invention.

Reference will now be made in greater detail to an exemplary embodiment of the present invention, an example of which is illustrated in the accompanying drawings, so that a person skilled in the art to which the present invention relates can easily put the present invention into practice. The present invention can be embodied in a variety of different forms, and it should not be understood that the present invention is limited to those disclosed herein. Throughout the drawings, those irrelevant to the description are omitted for the sake of clarity. Throughout this document, reference should be made to the drawings, in which the same reference numerals and symbols are used throughout the different drawings to designate the same or similar components.

Figure 2:
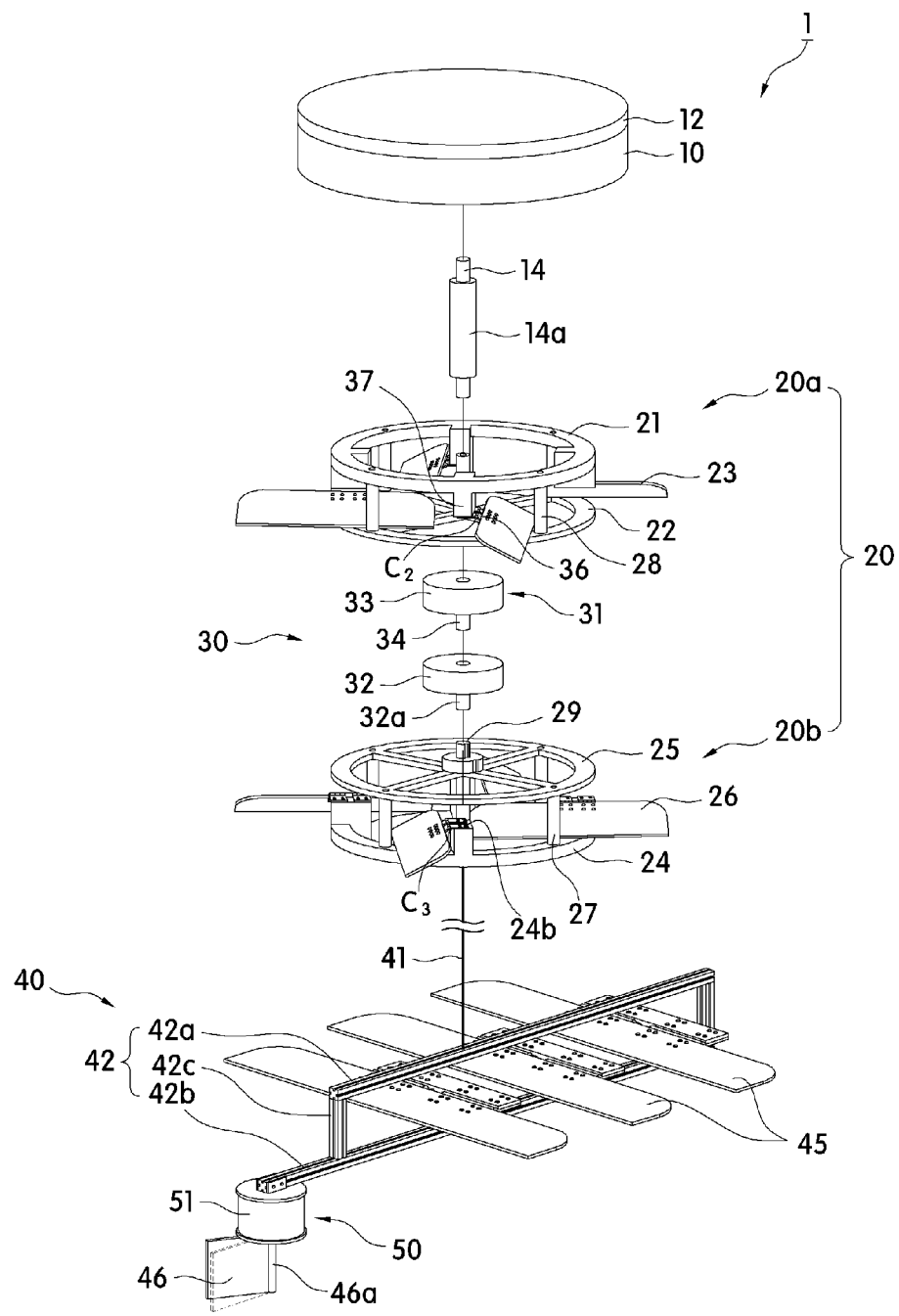
FIG. 2 is an exploded perspective view of the wave power generating apparatus illustrated in FIG. 1.

Referring to FIGS. 1 and 2, the wave power generating apparatus 1 includes a floating part 10, a power generator 30, a motion conversion unit 20, and a position control unit 40.

Referring to FIGS. 1 and 2, the wave power generating apparatus 1 according to this embodiment is configured such that the first rotary unit 20a coupled to the housing of the generator 31 and the second rotary unit 20b coupled to the drive shaft of the generator 31 rotate in opposite directions when the wave power generating apparatus 1 is moved upwardly and downwardly in the water by waves in the state in which the floating part 10 is floating on the sea surface. At this time, the rotation of the first rotary unit 20a and the rotation of the second rotary unit 20b are driven by the force of seawater applied to blades of the first and second rotary units. As the first rotary unit and the second rotary unit rotate in opposite directions, a rotor and a stator inside the housing of the generator 31 rotate in opposite directions such that the generator 31 can generate electricity. In addition, in the wave power generating apparatus according to an embodiment of the present invention, the position control unit 40 of the wave power generating apparatus includes a rudder 46 on one end of a propelling frame 42. In the state in which the floating part 10 is on the sea surface, when the wave power generating apparatus 1 moves in the top-bottom direction on waves, the floating part 10 can circulate within a predetermined range on the sea surface in response to the rudder 46 being operated. The floating part 10 can moor on the sea surface without an additional fixing device, such as an anchor.

More specifically, the floating part 10 may be implemented as a buoy having a preset size, the buoy being floatable on the sea surface. The size of the floating part 10 may be designed such that buoyancy able to support the entire weight of the wave power generating apparatus can be created.

The floating part 10 is illustrated as a cylindrical body having an additional base plate or a storage battery 12 such that an electromechanical system, such as observation equipment, can be mounted. However, this is not intended to be limiting, and the floating part can be provided in a variety of other shapes.

In addition, the storage battery 12 is disposed in the upper part of the floating part 10. The storage battery 12 is electrically connected to a power generator that will be described later, and stores electricity generated by the power generator. The stored electricity can be used as power for the electromechanical system or other driving sources.

Although the storage battery 12 was illustrated as being disposed in the upper part of the floating part 10 in this embodiment, the storage battery 12 can be positioned not only in the upper part of the floating part 10 but also in the lower part of the floating part 10 or underwater if the storage battery 12 is formed watertight.

The motion conversion unit 20 and the power generator 30 are disposed under the floating part 10. The motion conversion unit 20 is coupled with the floating part 10, and includes a first rotary part 20a and a second rotary part 20b in order to convert a vertical motion caused by the kinetic energy of waves into a rotational motion.

The floating part 10 includes a support 14 that can rotatably support the power generator 30, the first rotary part 20a, and the second rotary part 20b from below.

The support 14 is configured as a rod-shaped member extending downward from the lower portion of the floating part. Here, according to an embodiment of the present invention, the support 14 can be positioned on an extension C1 of the center of rotation about which the generator 31 of the power generator 30 rotates.

The generator 31 is coupled to the bottom end of the support 14. A bearing may be disposed between the support 14 and the generator 31 such that the generator 31 can rotate on the bottom end of the support 14.

A slip ring 14a is disposed on the outer circumference of the support 14. The slip ring 14a is a component that transmits electricity generated by the generator 31 rotating about the support 14 to the storage battery 12 positioned in the upper part of the floating part 10. With this configuration, the electricity generated by the generator 31 can be transmitted to the storage battery 12 through the slip ring 14a on the support 14 and through a cable (not shown) and subsequently stored in the storage battery 12.

According to an embodiment of the present invention, the power generator 30 includes a generator 31 connected to the motion conversion unit 20 including the first and second rotary parts 20a and 20b. The generator 31 coupled to the support 14 includes a substantially-cylindrical housing 33, with a drive shaft 34 extending downward from the housing 33.

The drive shaft 34 of the generator 31 is disposed on the extension C1 of the center of rotation of the housing 33 of the generator 31. Although not shown, the rotor and the stator are disposed inside the generator 31 such that relative rotation of the stator and the rotor can generate electricity. As an example, the stator may be fixedly disposed on the inner surface of the housing 33 of the generator 31, and the rotor may be connected to the drive shaft 34 and rotatably disposed inside the housing.

Referring to FIGS. 1 and 2, the first rotary unit 20a is coupled to the housing 33 of the generator 31, and the second rotary unit 20b is coupled to the drive shaft 34 of the generator 31.

The first rotary unit 20a is coupled to the housing of the generator 31 to rotate together with the housing about the extension of the center of rotation, in the direction of an arrow (A) (clockwise direction; hereinafter referred to as the "first rotation direction") when shown in FIG. 1.

Referring to FIG. 2, the first rotary unit 20a coupled to the housing 33 of the generator 31 includes a first frame 21, a second frame 22 and first blades 23.

The second rotary unit 20b is rotatably coupled to the drive shaft 34 of the generator 31.

A gearbox 32 is disposed between the drive shaft 34 of the generator 31 and the second rotary unit 20b. A center-of-rotation shaft 29 of the second rotary unit 20b is coupled to a connecting shaft 32a of the gearbox 32. The gearbox 32 can increase the speed of revolutions of the drive shaft of the generator 31 following the speed of rotation of the second rotary unit 20b such that the drive shaft of the generator 31 has a speed in which power can be generated.

According to an embodiment of the present invention, the second rotary unit 20b is configured to rotate in the direction of an arrow (B) (counterclockwise direction; hereinafter referred to as the "second rotation direction"), opposite to the first rotation direction in which the housing of the generator 31 rotates. The second rotary unit 20b includes a third frame 24, a fourth frame 25, and second blades 26.

According to an embodiment of the present invention, the first rotary unit 20a and the second rotary unit 20b are configured symmetric in the top-bottom direction about the generator 31. According to an embodiment of the invention, the first frame 21, the second frame 42, and the first blades 23 correspond to the third frame 24, the fourth frame 25, and the second blades 26 of the second rotary unit 20b.

A description will be given below of the second rotary unit 20b with reference to FIG. 3. Here, since the structure of the first rotary unit 20a is symmetric to the structure of the second rotary unit 20b, a detailed description of the first rotary unit 20a will be omitted.

Figure 3:
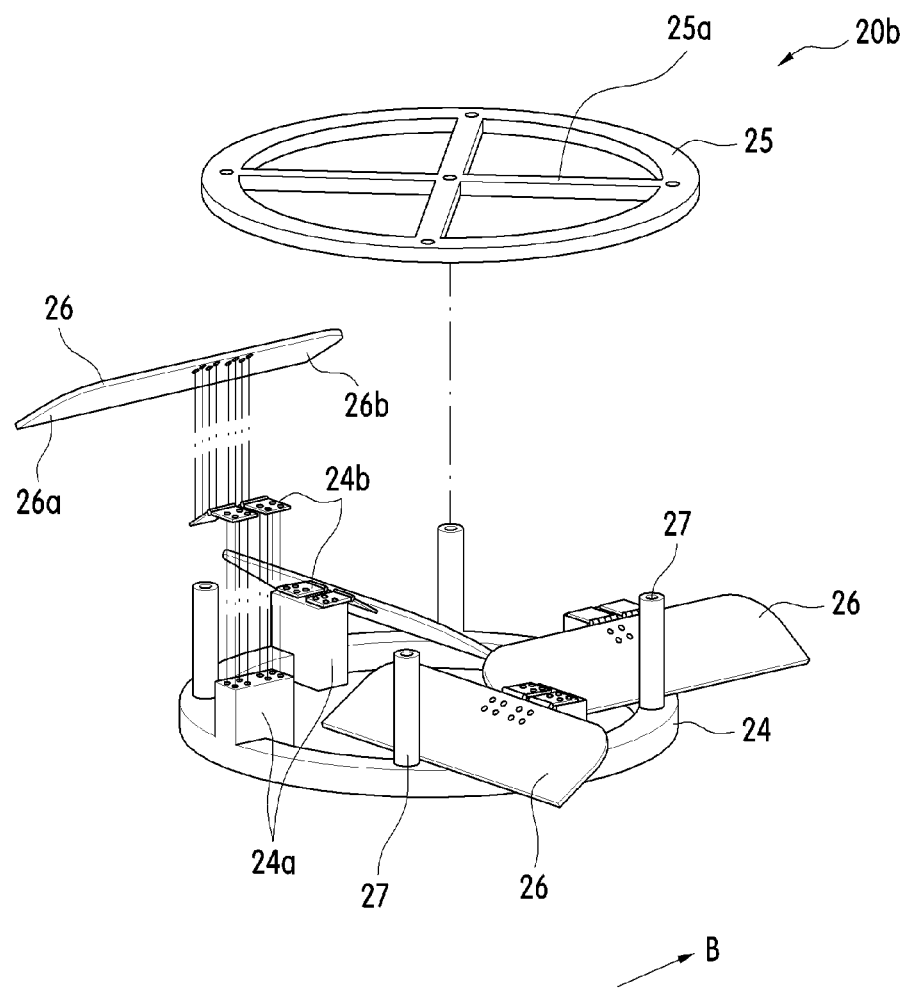
FIG. 3 is an exploded perspective view of the second rotary unit of the wave power generating apparatus illustrated in FIG. 1.

Referring to FIG. 3, the second rotary unit 20b includes the third frame 24, the fourth frame 25, and the second blades 26.

The third frame 24 is in the shape of a ring that extends around the extension of the center of rotation, and the drive shaft 34 of the generator 31 is positioned at the center of rotation of the ring-shaped third frame 24. The third frame 24 is connected to the drive shaft 34 of the generator 31 through the fourth frame 25 and the gearbox 32.

Referring to FIG. 3, a plurality of connecting bars 27 extending upward are disposed on the top surface of the third frame 24. In this embodiment, the four connecting bars 27 are arranged on the top surface of the third frame 24 at intervals of 90°. The fourth frame 25 in the same ring-shape as the third frame 24 is coupled to and supported by the top ends of the connecting bars 27.

A cross-shaped fourth frame support 25a is disposed within the fourth frame 25, and a center-of-rotation shaft 29 is disposed on the central portion of the fourth frame support 25a positioned in the central portion of the fourth frame 25 such that the center-of-rotation shaft 29 is coupled to the connecting shaft 32a of the gearbox 32.

According to an embodiment of the present invention, the second blades 26 are disposed between the third frame 24 and the fourth frame 25. A plurality of the second blades are disposed on the outer circumference of the ring-shaped third frame 24 such that the second blades are spaced apart from each other at preset distances.

Rectangular parallelepiped blade mounts 24a are disposed between the four connecting bars 27 such that the second blades 26 are disposed between the third frame 24 and the fourth frame 25. The blade mounts 24a protrude from the top surface of the third frame 24.

The second blades 26 are coupled to the top ends of the blade mounts 24a. The second blades 26 are positioned at the rear of the blade mounts 24a when viewed in the direction of rotation of the second rotary unit 20b, i.e. in the left of FIG. 3. The second blades 26 are coupled to the blade mounts 24a by hinge members 24b. As illustrated in FIGS. 2 and 3, each second blade 26 can pivot about a second pivot axis C3 of the corresponding hinge member 24b. As apparent from FIG. 2, the second pivot axis C3 is perpendicular to the extension C1 of the center of rotation. As apparent from FIGS. 2 and 3, each second blade 26 is in the shape of a plate in which one end portion 26a is positioned outside the third frame 24 in the radial direction and the other end portion 26b is positioned inside the third frame 24 in the radial direction in order to increase the amount of the force of seawater applied to the second blade 26 when the second blade 26 pivots about the second pivot axis C3.

Returning to FIG. 2, the first blades 23 corresponding to the second blades 26 can pivot about first pivot axes C2 of hinge members 36 coupled to blade mounts 37 of the first frame 21. As illustrated in FIG. 2, the first pivot axes C2 are arranged perpendicular to the extension C1 of the center of rotation. A plurality of the first blades 23 are disposed on the outer circumference of the ring-shaped first frame 21 such that the first blades 23 are spaced apart from each other. Like the second blades 26, each first blade 23 is in the shape of a plate in which one end portion is positioned outside the first frame 21 in the radial direction and the other end portion is positioned inside the first frame 21 in the radial direction in order to increase the amount of the force of seawater applied to the first blade 23 when the first blade 23 pivots about the first pivot axis C2.

According to an embodiment of the present invention, in the state in which the second blades 26 are disposed on the blade mounts 24a, the second blades 26 can rotate upwards about the second pivot axes C3 of the second blades 26 to a preset angle with respect to a plane P2 parallel to the upper surface of the third frame 24. The second blades 26 are also rotatable downwards to a preset angle. The preset angle α of the second blades 26 is greater than 0° and smaller than 90°, for example, 30°. However, this is not intended to be limiting.

In the wave power generating apparatus according to an embodiment of the present invention, when the second rotary unit 20b moves upwardly or downwardly, the angle of the second blades 26 changes. Accordingly, the second blades 26 can rotate in the same direction, i.e. the second rotation direction, regardless of whether the second rotary unit 20b moves upwardly or downwardly.

With reference to the figures, a more detailed description will be given below of the process in which the second rotary unit rotates in the second rotation direction by the power of the seawater.

Figure 4:
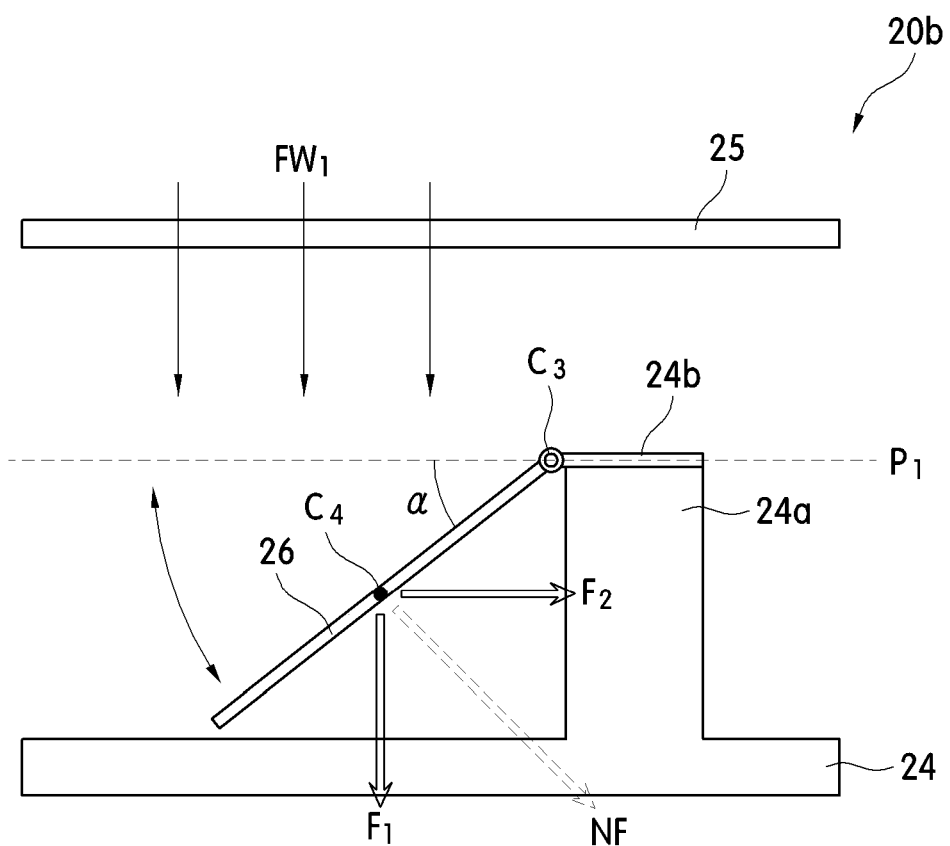
FIG. 4 is schematic views illustrating the operating state of the second rotary unit of the position-controlled wave power generating apparatus according an exemplary embodiment of the present invention.

FIG. 4 illustrates the direction of power applied to the second blades of the second rotary unit 20b in the state in which the wave power generating apparatus 1 according to an embodiment of the present invention is moving upwardly.

Referring to FIG. 4, in the state in which the second rotary unit 20b, i.e. the entire wave power generating apparatus is moving upwardly on the wave, the force of seawater Fw acts downwardly, as illustrated in FIG. 4.

Consequently, as illustrated in FIG. 4, each second blade 26 disposed on the second rotary unit 20b becomes inclined downward at a preset angle α with respect to the plane P2, which is parallel to the top surface of the third frame 24 and on which the second pivot axis C3 of the second blade 26 is disposed.

The angle α at which the second blade 26 is inclined with respect to the plane P2 on which the second pivot axis C3 of the second blade 26 is disposed may vary according to the speed at which the second rotary unit 20b moves upwardly and the speed of the wave.

When the second blade 26 is subjected to the force of seawater Fw from the seawater that applies a downward pressure in the state in which the second blade 26 is inclined downward with respect to the plane P2 on which the second pivot axis C3 of the second blade 26 is disposed, the second blade 26 is subjected to a tension F1 in the downward direction thereof about the center C4 of the seawater pressure applied to the second blade 26 and is subjected to a thrust F2 in the second rotation direction thereof, as illustrated in FIG. 4.

Consequently, in the state in which the second blade 26 is inclined downward with respect to the plane P2 on which the second pivot axis C3 of the second blade 26 is disposed, the second blade 26 applies a force for rotating the second rotary unit 20b in the second rotation direction (B) to the second rotary unit 20b. Accordingly, the second rotary unit 20b rotates in the second rotation direction (B).

Figure 5:
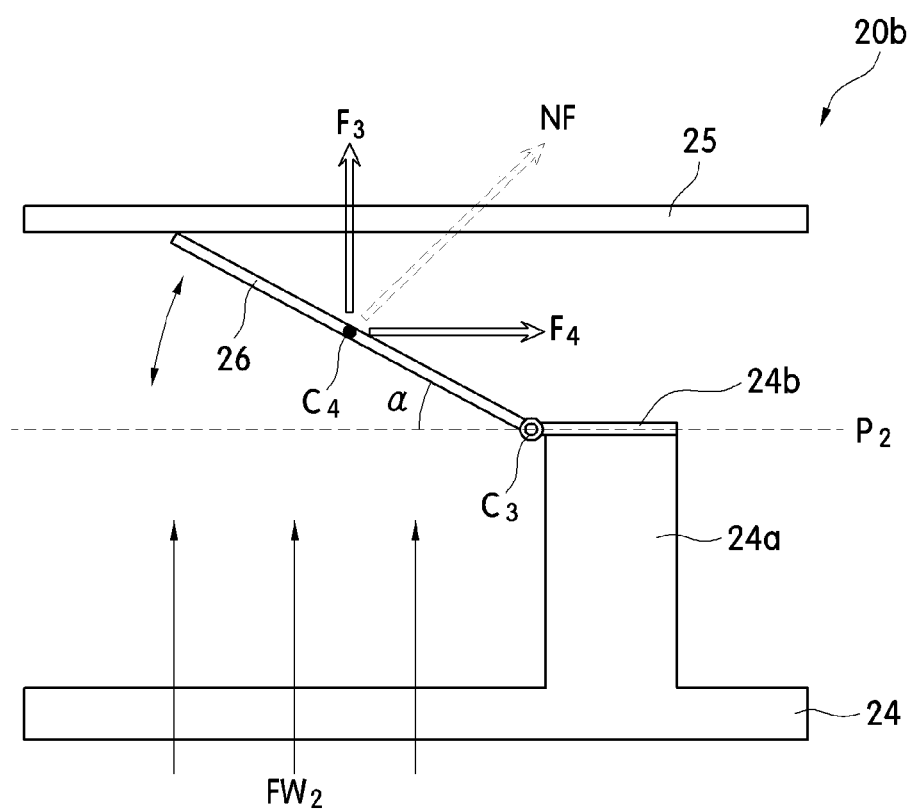
FIG. 5 is schematic views illustrating the operating state of the second rotary unit of the position-controlled wave power generating apparatus according an exemplary embodiment of the present invention.

FIG. 5 illustrates the direction of power applied to the second blades of the second rotary unit 20b in the state in which the wave power generating apparatus 1 according to an embodiment of the present invention is moving downwardly.

Referring to FIG. 5, in the state in which the second rotary unit 20b is moving downwardly, i.e. the entire wave power generating apparatus 1 is moving downwardly, the force of seawater F2 acts upwards, as illustrated in FIG. 5.

Consequently, as illustrated in FIG. 5, each second blade 26 disposed on the second rotary unit 20b becomes inclined upward at a preset angle α with respect to the plane P2, which is parallel to the top surface of the third frame 24 and on which the second pivot axis C3 of the second blade 26 is disposed.

The angle α at which the second blade 26 is inclined with respect to the plane P2 on which the second pivot axis C3 of the second blade 26 is disposed may vary according to the speed at which the second rotary unit 20b moves downwardly and the speed of the wave.

When the second blade 26 is subjected to the force of seawater Fw from the seawater that applies a downward pressure in the state in which the second blade 26 is inclined upward with respect to the plane P2 on which the second pivot axis C3 of the second blade 26 is disposed, the second blade 26 is subjected to a tension F3 in the upward direction thereof about the center C4 of the seawater pressure applied to the second blade 26 and is subjected to a thrust F4 in the second rotation direction thereof, as illustrated in FIG. 5.

Consequently, in the state in which the second blade 26 is inclined upward with respect to the plane P2 on which the second pivot axis C3 of the second blade 26 is disposed, the second blade 26 applies a force for rotating the second rotary unit 20b in the second rotation direction (B) to the second rotary unit 20b. Accordingly, the second rotary unit 20b rotates in the second rotation direction (B).

According to an embodiment of the present invention, regardless of whether the second rotary unit 20b is moving upwardly or downwardly, the second rotary unit 20b rotates in the second rotation direction by receiving a force of rotation in the second rotation direction (B) by means of the second blades 26. Consequently, the drive shaft 34 of the generator 31 coupled to the second rotary unit 20b rotates in the second rotation direction.

In contrast, the first rotary unit 20a rotates in the first rotation direction (A) opposite to the direction of rotation of the second rotary unit 20b regardless of whether the first rotary unit 20a is moving upwardly or downwardly, since the first rotary unit 20a is configured symmetric to the second rotary unit 20b.

When the first rotary unit 20a rotates in the first rotation direction (A) in this manner, the housing 33 of the generator 31 coupled to the first rotary unit 20a also rotates in the first rotation direction.

When the housing 33 of the generator 31 coupled to the first rotary unit 20a rotates in the first rotation direction, the state inside the generator 31 rotates in the opposite direction to the direction of rotation of the second rotary unit 20b, i.e. to the direction of rotation of the drive shaft of the generator 31. Consequently, the speed of rotation of the rotor with respect to the stator can be doubled comparing to the case in which only the second rotary unit 20b rotates, thereby increasing the efficiency of power generation.

The direction of rotation of the first rotary unit 20a becomes opposite to the direction of rotation of the second rotary unit 20b since the structure of the first rotary unit 20a is symmetric to the structure of the second rotary unit 20b. The principle in which the first rotary unit 20a rotates in the first rotation direction (A) is the same as the principle in which the second rotary unit 20b rotates. Therefore, a detailed description of the rotation of the first rotary unit 20a will be omitted.

The motion conversion unit that converts a vertical motion to a rotary motion in order to generate electricity from the kinetic energy of waves has been illustrated and described as including the first and second rotary parts having the first and second blades. However, this is not intended to be limiting, and the motion conversion unit may be embodied as gears.

Specifically, the motion conversion unit includes a vertical bar having a predetermined length, the upper end of the vertical bar coupled to the floating part, and a pinion gear meshed with a rack gear formed on one side surface or rack gears form on both side surfaces of the vertical bar. The pinion gear can be connected to the rotor of the generator including the stator and the rotor.

With this configuration, the generator can generate electricity from the rotational force of the pinion gear meshed with the rack gear moving in the top-bottom direction following the floating part that is moved up and down by the kinetic energy of waves.

In the wave power generating apparatus according to an embodiment of the present invention as described above, the housing of the generator suspending from the floating part that can float on the sea surface is rotated in the first rotation direction by the first rotary part while the second rotary part connected to the drive shaft of the generator rotates in the direction opposite to the first rotation direction. The rotor and the stator rotate with respect to each other within the generator rotate, thereby generating electricity.

Accordingly, the wave power generating apparatus according to an embodiment of the present invention has a simple configuration to generate electricity using the first and second rotary parts that rotate when the wave power generating apparatus is moved in the top-bottom direction by waves in the state in which the floating part is on the sea surface. It is possible to continuously generate electricity using the simple configuration.

In addition, in the wave power generating apparatus according to an embodiment of the present invention, the first rotary part and the second rotary part are symmetrical to each other in the top-bottom direction about the drive shaft of the generator. It is therefore possible to reliably generate power on wavy seas.

Figure 6:
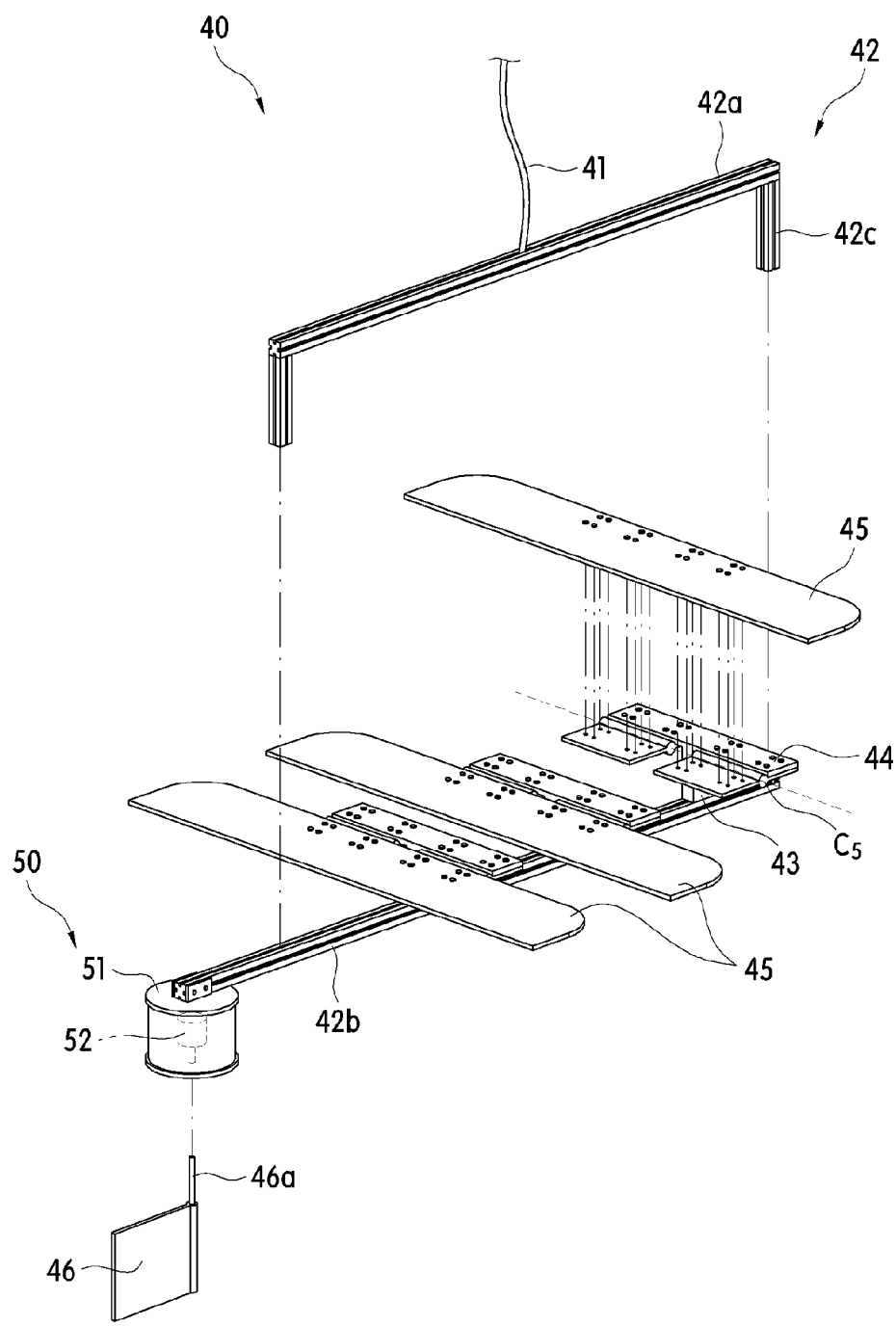
FIG. 6 is an exploded perspective view illustrating the position controlling unit of the position-controlled wave power generating apparatus according an exemplary embodiment of the present invention.

As illustrated in FIG. 1 and FIG. 6, in order to produce driving force from the kinetic energy of waves, the position control unit 40 is positioned below the sea surface and is connected to the motion conversion unit 20 by means of a mooring member 41 having a predetermined length. This feature controls the position of the floating part 10 floating on the sea such that the floating part 10 stays within a predetermined range.

The position control unit 40 includes a propulsion frame 42, a plurality of propulsion blades 45, and the rudder 46. The propulsion frame 42 is connected to one end of the mooring member 41, the other end of which is connected to the motion conversion unit 20. Predetermined ends of the plurality of propulsion blades 45 are rotatably assembled by means of hinge members 44 to fixed mounts 43 fixed to the propulsion frame 42 in order to generate propulsion force using the kinetic energy of waves. The rudder 46 is disposed on the propulsion frame 42 at a predetermined angle of inclination in order to redirect the propulsion frame 42 along a curve, the propulsion frame 42 proceeding in one direction using the propulsion force resulting from the rotation of the propulsion blades 45.

Here, the mooring member 41 may be implemented as an elastic band or an elastic wire formed of a stretchable material having a predetermined length in order to flexibly cope with changes in the distance between the motion conversion unit 20 and the propulsion frame 42, or may be implemented as a wire material that is limitedly stretchable.

The propulsion frame 42 includes upper and lower frames 42a and 42b and connecting frames 42c. The upper and lower frames 42a and 42b are arranged in a pair and parallel to each other in order to restrict the range of rotation of the propulsion blades that rotate in the top-bottom direction by means of the hinge members. The connecting frames 42c connect the upper and lower frames 42a and 42b such that the distance between the upper and lower frames 42a and 42b is maintained constant.

The plurality of fixed mounts 43 is fixedly disposed on the lower frame 42 at predetermined distances from each other. The number of the fixed mounts 43 is equal to the number of the propulsion blades 45. Shock-absorbing members, such as rubber members, may be provided on the inner surfaces of the upper and lower frames 42a and 42b in order to absorb shocks when the free ends of the propulsion blades 45 rotating in the top-bottom direction collide against the upper or lower frame 42a or 42b.

The propulsion blades 45 are coupled to the fixed mounts 43 by means of the hinge members 44 such that the propulsion blades 45 can rotate about a third pivot axis C5 perpendicular to the direction in which the propulsion frame 42 proceeds. This configuration forms a hinge rotary structure that is the same as that of rotary blades 23 and 26 provided on the first and second rotary parts 20a and 20b.

In this case, it is preferable that the size of the fixed mounts and the hinge members be greater than the width of the propulsion frame in order to increase the coupling force between the propulsion blades and the propulsion frame.

Each of the propulsion blades 45 may be implemented as a plate in a substantially rectangular shape that extends a predetermined direction in the lateral direction while perpendicularly intersecting the lengthwise direction of the propulsion frame 42.

Each of the hinge members 44 provided on the rotary blades and the propulsion blades may be implemented as a hinge plate including a plate member, a predetermined end of which is fixed to the mount or fixed mount, and pin members rotatably connecting to the plate member fixed to the blade plate. However, this is not intended to be limiting, but each of the hinge members 44 may have a variety of connecting hinge structures that allow the free ends of the rotary blades and the propulsion blades to be rotated by the energy of waves.

As illustrated in FIG. 1, it is preferable that the rudder 46 be disposed at an angle of inclination 13 with respect to the straight direction D without being parallel to the propulsion frame 42. When the propulsion force generated by the propulsion blades 45 propels the propulsion frame 42 to proceed linearly in one direction, the rudder 46 serves to convert the straight direction to the curve direction, such that the floating part 10 floating on the sea surface can stay within a predetermined range.

In addition, also provided is a steering unit 50 that can steer the rudder 46 based on angular displacements instructed by external signals transmitted from a remote control room located on the land. Consequently, it is possible to freely steer the propulsion frame to proceed in both the straight direction and the curved direction.

The steering unit 50 includes a chamber 51 and a steering motor. The chamber 51 is fixedly disposed on the propulsion frame 42, and has an airtight structure to prevent seawater from penetrating into the chamber 51. The drive shaft of the steering motor 52 is directly or indirectly connected to the rotary shaft 46a of the rudder 46.

Here, the steering motor 52 may be implemented as a stepping motor or a servomotor, the angle of rotation of which can be precisely controlled. The steering motor 52 can operate by receiving external power supplied from a battery or electricity generated by the power generating unit.

When the drive shaft of the steering motor 52 is rotated in response to an external signal, the rotary shaft of the rudder 46 connected to the steering motor is rotated, whereby the rudder 46 is directed parallel to the linear propulsion frame 42. In this state, the propulsion force generated by the propulsion blades 45 propels the propulsion frame 42 in the straight direction D under the sea surface, thereby moving the floating part 10 to another position.

In contrast, when the rudder 46 is converted to a position inclined by a predetermined angle with respect to the propulsion frame 42 having the linear structure, the propulsion force generated by the propulsion blades 45 propels the propulsion frame 42 to proceed along the curved direction D1 under the sea surface.

According to the angle of the rudder 46, the floating part 10 can be steered to move to a preset position in the straight direction or to circulate within a limited range such that precision observation is possible. Here, the floating part 10 is mounted with an observation system and is connected to the position control unit 40 via the mooring member.

The propulsion blades 45, predetermined ends of which are rotatably assembled to the propulsion frame, are rotatably coupled to the propulsion frame by means of the hinge members in the same manner as the rotary blades of the first and second rotary parts 20a and 20b. The propulsion blades 45 repeatedly pivot in the top-bottom direction in response to the energy of waves, thereby generating linear propulsion force.

That is, when the position control unit 40 is subjected to an upward or downward pressure from the seawater, normal force is created in the vertical direction on the top surfaces or the bottom surfaces of the propulsion blades that contact the seawater. The normal force is divided into tension directed upward or downward of the propulsion blades and thrust in the longitudinal direction of the propulsion frame.

The thrust occurring in the same direction regardless of the pivoting operation of the propulsion blades in the top-bottom direction can lead to propelling force by which the propulsion frame 42 proceeds in one direction.

Consequently, the propulsion blades 45 repeatedly pivoting in the top-bottom direction in response to the energy of waves work with the thrust induced from the normal force acting on the propulsion blades 45 to propel the propulsion frame 42 under the sea surface in the straight direction D parallel to the longitudinal direction of the propulsion frame. Due to this propulsion, the floating part connected to the propulsion frame by means of the mooring member can be relocated.

In addition, steering the rudder 46 provided on one end of the propulsion frame converts the straight direction to the curved direction, such that the floating part 10 circulate within a predetermined range on the sea surface. The floating part 10 can moor on the sea surface without an additional fixing device, such as an anchor, or weather observation can be precisely performed in a restricted position.

Figure 7:
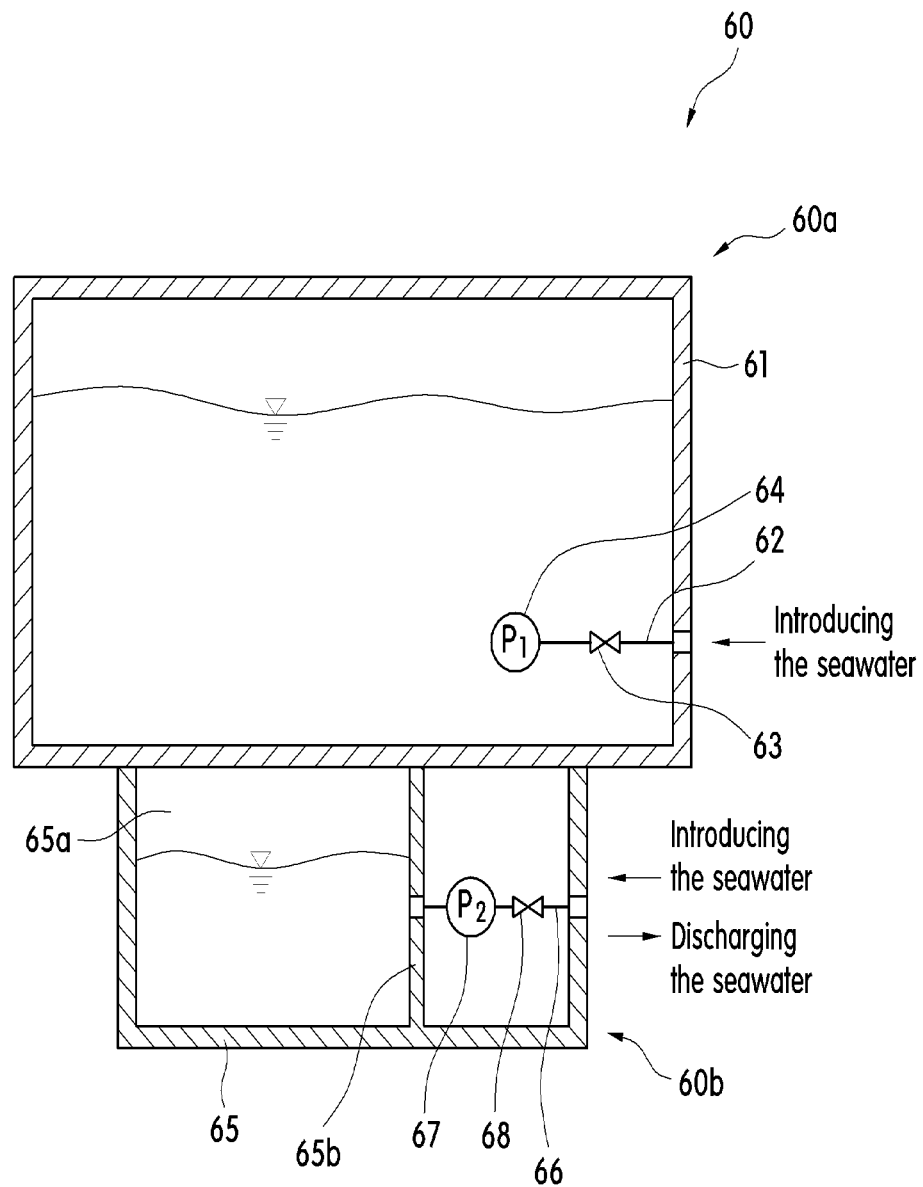
FIG. 7 is a schematic view illustrating the buoyancy controlling unit of the position-controlled wave power generating apparatus according an exemplary embodiment of the present invention.

Referring to FIG. 7, the floating part 10 further includes an buoyancy control unit 60. In the case of bad weather, such as heavy rain or a hurricane, the buoyancy control unit 60 controls the buoyancy of the floating part such that the floating part and the electromechanical system mounted on the floating part submerge blow the sea surface in order to prevent the structures mounted on the floating part from being damaged.

The buoyancy control unit 60 includes a first buoyancy control part 60a including a first tank 61 and a first pump 64. The first tank 61 is fixedly disposed on the floating part and having an inner space of a predetermined size. The first pump 64 is connected to a first seawater input line 62 through which seawater enters such that the seawater is contained in the inner space of the floating part to decrease the buoyancy of the floating part.

Here, a first valve 63 is provided on the first seawater input line 62. The first valve 63 controls the opening/closing of a path along which the seawater enters the first tank 61.

When the inner space of the first tank 61 is filled with the seawater through the intake operation of the first pump 64, the entire weight of the floating part increases in proportion to the amount of the seawater that has entered the first tank, whereby the floating part submerges to a predetermined depth below the sea surface.

The floating part 10 that has submerged to the predetermined depth below the sea surface can stay at a predetermined submergence position due to an air layer formed in the first tank and the buoyancy of the floating part.

Referring to FIG. 7, the buoyancy control unit 60 includes a second buoyancy control part 60b able to secondarily control the submergence position of the floating part 10, precisely in the top-bottom direction, when the floating part 10 is submerged below the sea surface by the first buoyancy control part 60a.

The second buoyancy control part 60b includes a second tank 65 and a second pump 67. The second tank 65 is provided on the outer surface of the first tank 61, and defines therein an adjustment space 65a of a predetermined size divided by a partition 65b. The second pump 67 is connected to a second seawater line 66 through which seawater is introduced into the adjustment space 65a or is discharged from the adjustment space to the outside.

A second valve 68 is provided on the second seawater line 66. The second valve 68 controls the opening/closing of a path along which the seawater is introduced into or discharged from the adjustment space 65.

In the state in which the floating part 10 is submerged to a predetermined depth below the sea surface by introducing the seawater into the first tank 61 by bidirectional pumping of the first pump, a more precise amount of seawater is introduced into or discharged from the adjustment space 65a of the second tank 65 by bidirectional or inverse pumping of the second pump provided in the second buoyancy control part 60b, whereby the submergence position of the floating part 10 that has submerged to the predetermined depth below the sea surface can be precisely adjusted in the top-bottom direction.

Although the exemplary embodiments of the present invention have been described for illustrative purposes, a person skilled in the art will appreciate that various additions, modifications, omissions and substitutions are possible, without departing from the scope and spirit of the present invention as disclosed in the accompanying claims.

What is claimed is:

1. A position-controlled wave power generating apparatus comprising:
   a floating part floatable on a body of water;
   a motion conversion unit coupled to the floating part, wherein the motion conversion unit converts a vertical motion caused by energy of waves into to a rotational motion;
   a power generating unit generating electricity using a generator connected to the motion conversion unit; and
   a position control unit positioned below a water surface to generate a thrust from the energy of waves, the position control unit being connected to the motion conversion unit by means of a mooring member having a predetermined length,
   wherein the generator comprises a housing and a drive shaft coupled to the housing, the drive shaft being positioned on an extension line extending in a top-bottom direction from a center of rotation of the housing,
   wherein the motion conversion unit comprises:
   a first rotary part coupled to the housing of the generator, the first rotary part being rotatable together with the housing in a first direction about the extension line of the center of rotation; and
   a second rotary part coupled to the drive shaft of the generator, the second rotary part being rotatable together with the housing in a second direction opposite to the first direction,
   wherein the first rotary part comprises a first frame coupled to the housing of the generator and a first rotary blade disposed on the first frame, the first rotary blade configured to pivot about a first pivot axis perpendicular to the extension of the center of rotation,
   wherein the second rotary part comprises a third frame coupled to the drive shaft of the generator and a second rotary blade disposed on the third frame, the second rotary blade configured to pivot about a second pivot axis perpendicular to the extension of the center of rotation.

2. The position-controlled wave power generating apparatus according to claim 1, Wherein the position control unit comprises:
   a propulsion frame connected to the motion conversion unit by means of the mooring member;
   a propulsion blade configured to pivot about a third pivot axis perpendicular to a straight direction of the propulsion frame; and
   a rudder disposed on the propulsion frame at a predetermined angle of inclination, the rudder configured to convert a direction in which the propulsion frame proceeds to a curved direction,
   wherein, in a position in which the floating part is on the water surface and the generator, the first rotary part and the second rotary part are submerged in water, when the generator, the first rotary part, and the second rotary part are moved in a top-bottom direction in the water by waves, the housing and the drive shaft are rotated in opposite directions by force that the waves apply to the first rotary blade and the second blade, whereby the generator generates electricity, and
   wherein a thrust from the propulsion blade controls a position of the floating part floating on the water surface to be maintained within a predetermined range.

3. The position-controlled wave power generating apparatus according to claim 2, wherein the propulsion frame comprises upper and lower frames arranged in a pair and parallel to each other and connecting frames connecting the upper and lower frames such that a predetermined distance is maintained between the upper and lower frames.

4. The position-controlled wave power generating apparatus according to claim 3, wherein a plurality of the propulsion blades is disposed on one of the upper and lower frames in a longitudinal direction of the frames, the plurality of the propulsion blades being spaced apart from each other.

5. The position-controlled wave power generating apparatus according to claim 2, wherein the position control unit comprises a steering part that converts a direction in which the propulsion frame proceeds to a straight direction or a curved direction,
   wherein the steering part comprises;
   a chamber provided in the propulsion frame; and
   a steering motor disposed in an inner space of the chamber, the steering motor rotating a rotary shaft of the rudder rotatably assembled to the propulsion frame.

6. The position-controlled wave power generating apparatus according to claim 1, wherein
   the first frame is in a shape of a ring that is disposed about the extension of the center of rotation, and
   a plurality of the first blades are disposed on an outer circumference of the ring-shaped first frame and are spaced apart from each other.

7. The position-controlled wave power generating apparatus according to claim 6, wherein the plurality of the first blades are positioned at rear of the first pivot axis when viewed in the direction in which the first rotary part rotates, and wherein the plurality of the first blades are able to pivot to an angle greater than 0° and smaller than 90° in a top-bottom direction about the first pivot axis.

8. The position-controlled wave power generating apparatus according to claim 7, wherein each of the first blades is in a shape of a plate, the plate extending such that one end thereof is positioned outside the first frame in order to increase an amount of force of water applied thereto when the first blade rotates about the first pivot axis.

9. The position-controlled wave power generating apparatus according to claim 1, wherein the third frame is in a shape of a ring that is disposed about the extension of the center of rotation, and a plurality of the second blades are disposed on an outer circumference of the ring-shaped third frame and are spaced apart from each other.

10. The position-controlled wave power generating apparatus according to claim 9, wherein the plurality of the second blades are positioned at rear of the second pivot axis when viewed in the direction in which the second rotary part rotates, and wherein the plurality of the second blades are able to pivot to an angle greater than 0° and smaller than 90° in a top-bottom direction about the second pivot axis.

11. The position-controlled wave power generating apparatus according to claim 10, wherein each of the second blades is in a shape of a plate, the plate extending such that one end thereof is positioned outside the third frame in order to increase an amount of force of water applied thereto when the first blade rotates about the second pivot axis.

12. The position-controlled wave power generating apparatus according to claim 1, further comprising a gearbox coupled between the drive shaft of the generator and the second rotary unit.

13. The position-controlled wave power generating apparatus according to claim 1, wherein the first rotary unit is symmetric to the second rotary unit in a top-bottom direction about the generator.

14. The position-controlled wave power generating apparatus according to claim 1, further comprising a buoyancy control unit controlling buoyancy of the floating part, wherein the buoyancy control unit comprises:

a first tank disposed on the floating part;

a first pump connected to a first water input line through which water is introduced into an inner space of the first tank; and a first buoyancy control part firstly controlling the floating part to be submerged to a predetermined depth below the water surface.

15. The position-controlled wave power generating apparatus according to claim 14, wherein buoyancy control unit further comprises:

a second tank disposed on an outer surface of the first tank;

a second pump connected to a second water input line through which water is introduced into or discharged from an adjustment space divided by a partition disposed within the second tank; and a second buoyancy control part secondly controlling a submergence position of the floating part in a top-bottom direction, the floating part having been submerged below the water surface by the first buoyancy control part.

* * * * *